United States Patent [19]

Davis

[11] Patent Number: 4,826,193

[45] Date of Patent: May 2, 1989

[54] WHEEL CHAIR RESTRAINT

[76] Inventor: Robert J. Davis, 8440 SW. Mohawk, Tualatin, Oreg. 97062

[21] Appl. No.: 81,338

[22] Filed: Aug. 4, 1987

[51] Int. Cl.⁴ .................................................. B60N 1/00

[52] U.S. Cl. .................................. 280/304.1; 248/499; 280/250.1; 296/65.1; 410/3; 410/7; 410/8; 410/51; 410/105; 410/106

[58] Field of Search ............... 280/242 WC, 289 WC, 280/289 R; 296/65 R; 410/3, 4, 7, 8, 10, 11, 20, 21, 23, 30, 51, 77, 101, 105, 106, 108, 109, 112, 113, 132, 141, 156, 103; 248/224.3, 224.4, 499

[56] References Cited

U.S. PATENT DOCUMENTS 3,061,331 10/1962 Lantis .............................. 248/499 X 4,427,210 1/1984 Wevers .................. 280/242 WC X 4,688,843 8/1987 Hall .................................. 296/65 R

*Primary Examiner*—Charles A. Marmor

*Assistant Examiner*—Mitchell J. Hill

*Attorney, Agent, or Firm*—Robert L. Harrington

[57] ABSTRACT

A wheel chair restraint that includes a bracket that attaches to the wall of a hospital hallway at a desired height. The bracket includes an envelope with a top opening and a vertical slot for receiving a T-shape latch. The latch is tethered to the wheel chair and can be readily connected or disconnected to the bracket. This satisfies the combined safety requirements of keeping a clear pathway through the hallway while also enabling quick disconnect of the latch for emergency evacuation in a catastrophe situation such as a fire.

2 Claims, 1 Drawing Sheet

WHEEL CHAIR RESTRAINT

FIELD OF INVENTION

This invention relates to a device for restraining wheel chairs, and more particularly to a device for quick release restraining means.

BACKGROUND OF THE INVENTION

There are many cases of patients that are either physically incapable of maneuvering a wheel chair or are mentally irresponsible in the maneuvering of a wheel chair. It is not feasible for a facility such as a hospital, a nursing home, or the like which care for a large number of such patients, to have an attendant for each of these wheel chair-bound patients. (The term wheel chair is used herein to encompass geriatric chairs and the like as well as the wheeled chair commonly referred to as a "wheel chair.")

To enable a few attendants to care for a much greater number of patients, it is a common practice to place the patients in common areas such as a hall or corridor, a recreation room, dining hall and the like. The activity that takes place in such common areas is generally considered by the patients as a break from the monotony of being confined to one's bed.

Whereas patients generally enjoy the activity, the hallway in particular is obviously the pathway for numerous transportation needs including emergency evacuation needs. Hospital rules cannot permit the hallways to become a safety hazard with wheel chairs randomly strewn along the hallway. Positioning the wheel chairs along the wall of a hallway will clear a pathway and satisfy most safety concerns except that the wheel chair cannot be expected to remain along the wall without restraint. However, restraining the wheel chairs creates a further safety problem. In a catastrophe, e.g. a fire, the patients in wheel chairs must be moved quickly and a typical restraint can take precious seconds to release. Such typical restraints are thus unacceptable. The same concern, although perhaps not to the same degree, exists for other common areas as well.

Another problem that arises concerns cost. Hallway activity for wheel chair patients is a low priority concern, and most austere-minded medical-care budgets do not allow for items such as quick-release hallway restraints for wheel chairs. Thus a further concern of the present invention is its cost.

BRIEF DESCRIPTION OF THE INVENTION

The present invention achieves the desired results of an effective restraint to restrain wheel chairs against the wall of a hallway or the like, said restraint being easily and quickly releasable and both the above being achieved at low cost.

A flexible strap carries a male latch member with the ends of the straps secured to the side rails of the wheel chair. A female bracket is secured to a wall. The male and female members are readily coupled and uncoupled. The only construction that takes place is the securing of the bracket to an appropriate position on the wall. The strap ends are buckled to the wheel chair with no interference to the normal use of the wheel chair. When it is desirable to move a patient into the hallway, the wheel chair is simply backed up to the female bracket and the male latch member inserted into the bracket. The bracket secures the wheel chair and patient to the wall. Release of the latch is simple and quick and satisfies the need for emergency evacuation should that become necessary.

The invention will be more clearly understood by reference to the following detailed description and drawings wherein.

Figure 4:
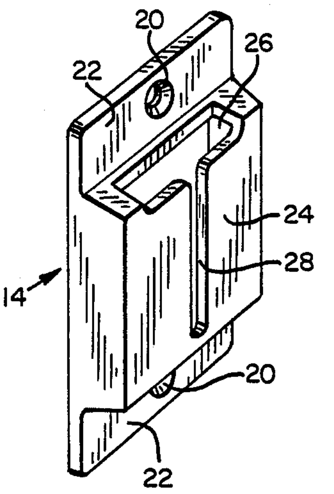
FIG. 4 is a perspective view of the female bracket of the invention of FIG. 1.
Figure 2:
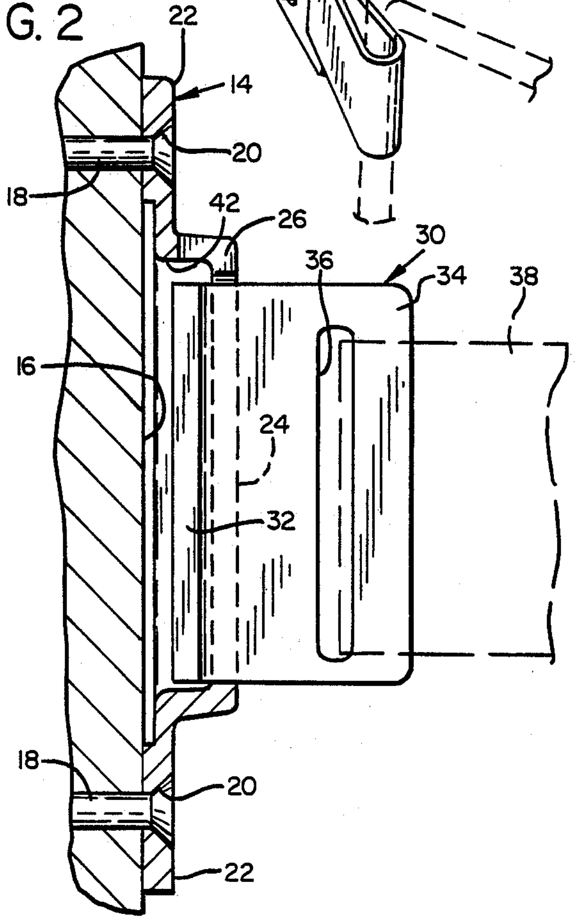
FIG. 2 is a section view as taken on view lines 2—2 of FIG. 1.

Having reference to the drawings, a wheel chair is illustrated in part in dash lines including support rails 10 that include handles 12 that the attendant uses to guide the wheel chair. A female bracket 14 is attached to a wall 16 by flathead screws 18. As seen in FIGS. 2 and 4, screw openings 20 in the bracket are countersunk so that the screw heads are inset so as to lie flat against the bracket 14 (see FIG. 2). The bracket 14 is most clearly illustrated in FIG. 4. It comprises a back plate 22 and an envelope 24 formed on the back plate 22. The envelope 24 includes a top opening 26 and front slot 28 that is open to the top opening 26 and extends substantially down the front of the envelope.

Figure 1:
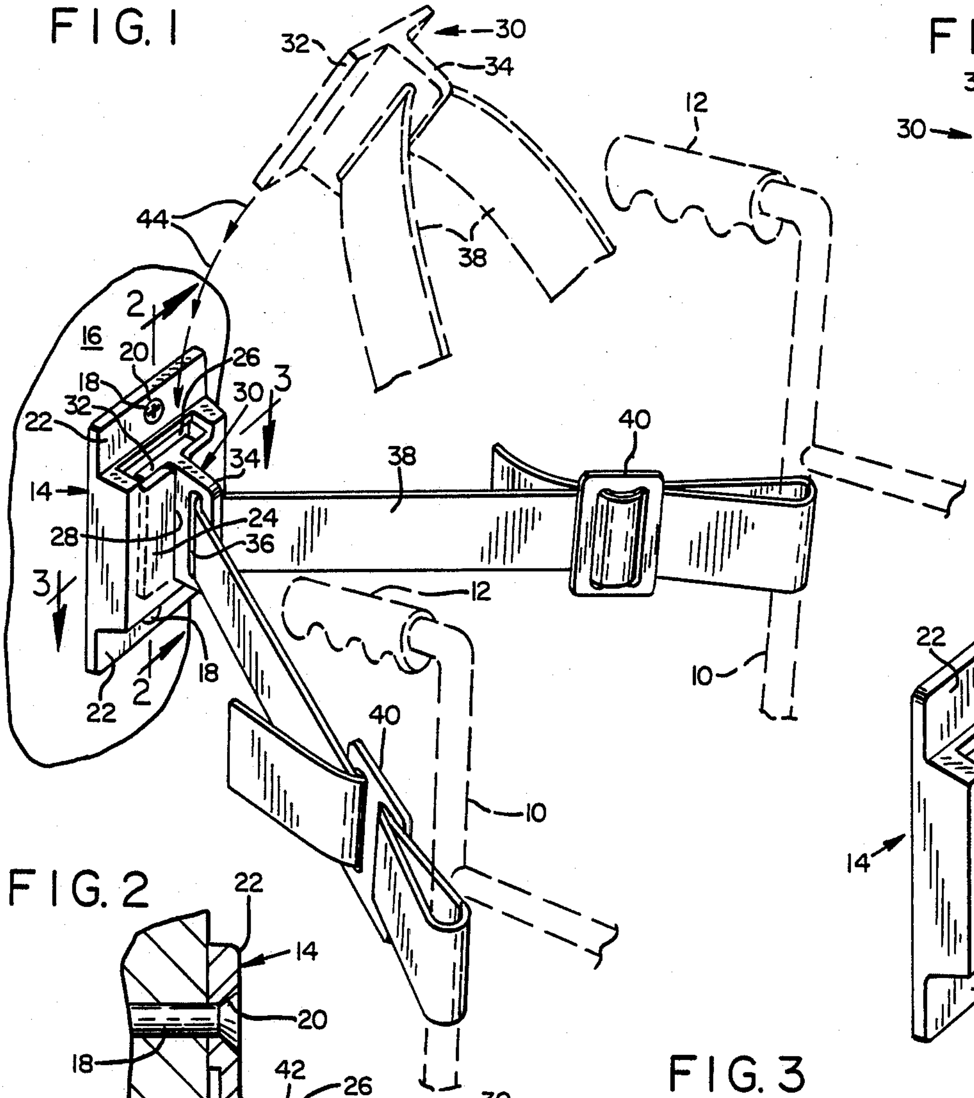
FIG. 1 is a perspective view illustrating a preferred embodiment of the invention.
Figure 5:
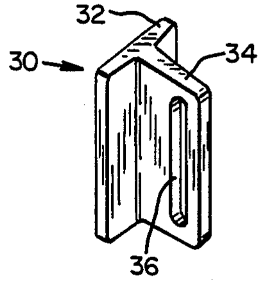
FIG. 5 is a perspective view of the male latch member.
Figure 3:
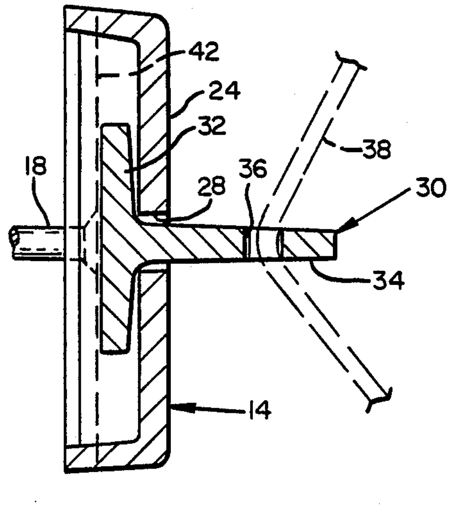
FIG. 3 is a section view as taken on section lines 3—3 of FIG. 1.

The male latch member 30 is most clearly illustrated in FIG. 5. It comprises a T-shaped lug member with a crossbar 32 and integral rib 34 which is provided with a slot 36. The slot 36 is designed to receive a strap 38. (See FIGS. 1 and 3) The strap 38 is provided with buckles 40 that allows the two ends of the strap to be anchored on the support rails 10 of the wheel chair as illustrated in FIG. 1.

Operation

The interconnection of the male latch and female bracket is indicated in the drawings. As shown the interconnection occurs by sliding the crossbar 32 of the lug member into the top opening 26, with the rib 34 projected out of the slot 28. The insertion process is very simple and involves nothing more than gripping the rib and sliding the crossbar down through the opening 26. (See the dash lines of FIG. 1)

Unlatching the device is accomplished in reverse by pulling the latch member forward and upward in the envelope. A shoulder 42 formed between the wall behind the envelope 24 and the back plate 22 inhibits a straight upward motion of the latch member; i.e. the latch member cannot be slid upwardly unless it is also pulled forward in the envelope so as to bypass the shoulder 42. This can be seen most clearly from FIG. 2.

The operation, as an initial step, requires first attaching the latch member 30 to the wheel chair. The strap 38 functions as a tether and the buckles 40 enables the strap and latch member 30 to be fastened to any of the rails, braces or crossbars of the wheel chair. In the embodiment illustrated, the strap ends are fastened by buckles 40 to the handlebar rails 10 but with the strap first looped through slot 36 of the latch member. As long as the strap ends are buckled to the rails, the latch member will remain secured; i.e. tethered to the wheel chair.

Next is the placement of the bracket 14 on the wall 16. Preferably the bracket is positioned at about the height of the attachment of the straps to the wheel chair. As indicated, it is secured with flathead screws 18 projected through openings 20 in the bracket and into the wall (FIG. 2).

With the bracket 14 attached to the wall and the latch 30 affixed to the wheel chair, an attendant need only back the wheel chair up to the bracket and slip the latch through the opening 26. The chair is thus secured to the wall until removal is desired. The latch is then simply pulled forward and upward until the latch clears the opening 26. See the dash lines of FIG. 1 wherein the insertion process is illustrated by arrows 44 but which could also illustrate unlatching simply by reversing the arrows.

It will be appreciated that a number of variations are possible without departing from the invention. For example, if latching were required to be more secure, a releasable lock could be employed to prevent upward sliding of the latch without depressing a release button or the like. However, this is considered to defeat one of the objectives, as simplicity in the release of the patient is considered desirable. In furtherance of such simplicity, the shoulder 42 could be modified to remove any encumbrance for upward sliding of the latch.

These and other similar modifications and variations are encompassed as will be determined from the definitions of the claims appended hereto.

I claim:

1. A wheel chair restraint for restricting the mobility of a wheel chair bound patient, comprising;

a wheel chair having a frame with opposite side rails positioned behind and on opposite sides of the patient sitting in the wheel chair, a single flexible elongated tether attached to said opposite side rails of said wheel chair, a bracket assembly including a male component releasably coupled to a female component, said female component being an envelope-shaped receiving member and said male component being a configured lug slidable into and out of the receiving member for coupling and decoupling of the components, one of said components attached to the single tether at a position thereon spaced from the attachment thereof to said opposite side rails, and the other of said components attached to a wall whereby the wheel chair bound patient can be backed to the wall-attached component and the tether-attached component can be coupled thereto for restricing movement, and said components being readily decoupled by providing slack in the tether and sliding the components apart.

2. A wheel chair restraint as defined in claim 1 wherein the female component is secured to the wall and the male component is tethered to the wheel chair.

* * * * *